(12) United States Patent
Meixner et al.

(10) Patent No.: US 7,926,871 B2
(45) Date of Patent: Apr. 19, 2011

(54) HEADREST FOR PROTECTING AGAINST WHIPLASH

(75) Inventors: Armin Meixner, Cremlingen (DE); Manfred Helm, Braunschweig (DE); Andreas Hoffmeister, Braunschweig (DE); -Ing Dirk Pförtner, Braunschweig (DE); Peter Schmuda von Trzebiatowski, Schöppenstedt (DE); Horst Rademacher, Isenbüttel (DE); Ralf Lühring, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 489 days.

(21) Appl. No.: 11/993,626

(22) PCT Filed: May 24, 2006

(86) PCT No.: PCT/EP2006/062557
§ 371 (c)(1),
(2), (4) Date: Dec. 21, 2007

(87) PCT Pub. No.: WO2006/136485
PCT Pub. Date: Dec. 28, 2006

(65) Prior Publication Data
US 2010/0072795 A1    Mar. 25, 2010

(30) Foreign Application Priority Data

Jun. 23, 2005   (DE) .......................... 10 2005 030 313

(51) Int. Cl.
*B60N 2/42* (2006.01)
*B60N 2/427* (2006.01)
*B60N 2/48* (2006.01)
*B60R 21/00* (2006.01)

(52) U.S. Cl. ................................................. 297/216.12
(58) Field of Classification Search .............. 297/216.12
See application file for complete search history.

(56) References Cited

U.S. PATENT DOCUMENTS

| 3,205,005 | A | * | 9/1965 | Brown ................. 297/216.12 X |
| 3,403,938 | A | * | 10/1968 | Cramer et al. ................. 297/391 |
| 3,508,788 | A | * | 4/1970 | Barton, Jr. et al. ............. 297/391 |
| 3,528,703 | A | * | 9/1970 | Ohta ............................. 297/391 |

(Continued)

FOREIGN PATENT DOCUMENTS

DE          195 09 014 A1     9/1996

(Continued)

*Primary Examiner* — Rodney B White
(74) *Attorney, Agent, or Firm* — Norris McLaughlin & Marcus, PA

(57) ABSTRACT

The invention relates to a headrest (10) for a vehicle seat, in particular for a backrest for a motor vehicle seat, said headrest essentially comprising a headrest frame or headrest casing (14) and a foam base body (356) that surrounds the headrest frame or casing (14). In the event of a rear impact on the motor vehicle, the headrest remains fixed in relation to the backrest (conventional headrest) or at least part of the headrest is immediately displaced towards the vehicle occupant (active headrest). According to the invention, the head of a vehicle occupant can be brought into contact with the headrest (10) at least at two different heights ($k1_z$, $k2_z$), (two-point contact), to reduce or neutralize a torque ($M_y$) about a y-axis (y-y) in the vicinity of the vertebral column and to prevent accident-related injuries to the seat occupant, in particular to prevent cervical spine syndrome or a whiplash injury in the event of a front and/or rear impact. A head centre of gravity (HCG) is also configured between the two heights ($k1_z$, $k2_z$) of the headrest (10).

14 Claims, 9 Drawing Sheets

U.S. PATENT DOCUMENTS

Figure 1:
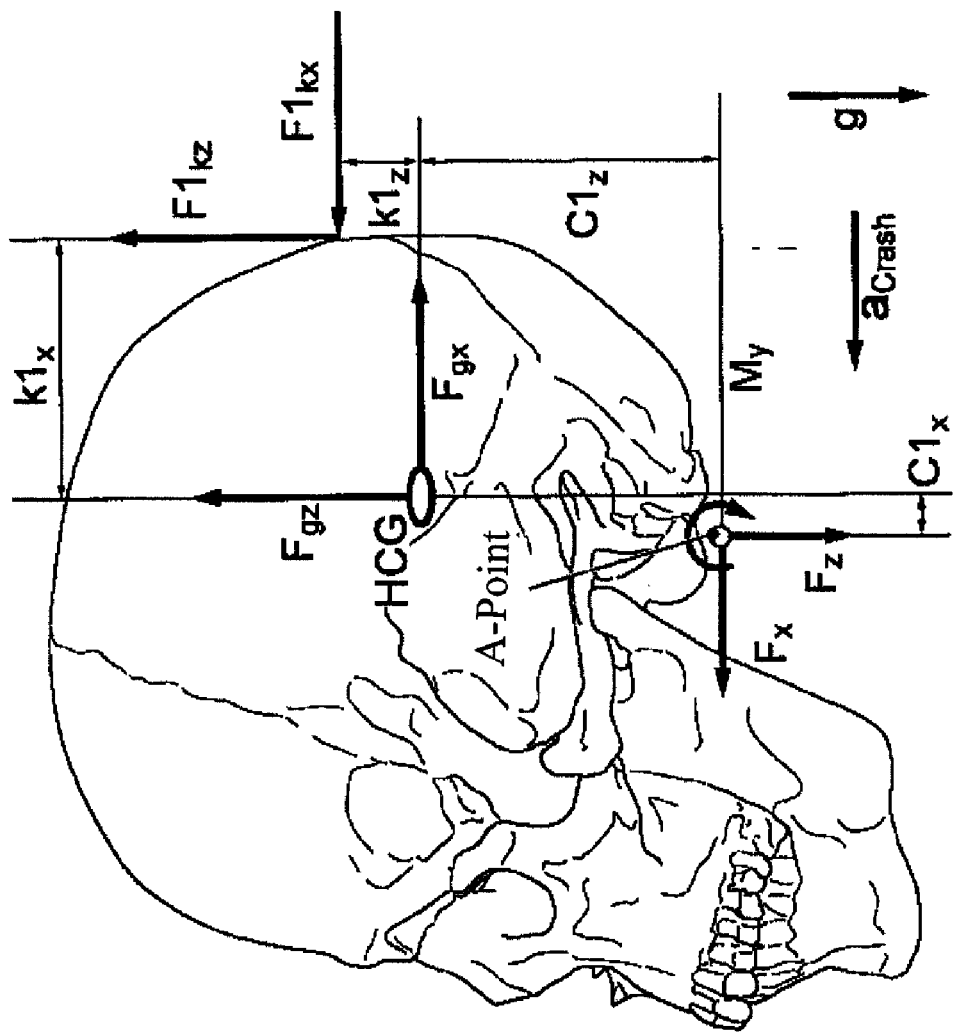

| | | | |
|---|---|---|---|
| 3,547,486 A * | 12/1970 | Herzer et al. | 297/408 |
| 3,680,912 A * | 8/1972 | Matsuura | 297/216.12 X |
| 4,489,979 A * | 12/1984 | Zyngier | 297/391 |
| 4,527,834 A * | 7/1985 | Zyngier | 297/410 |
| 4,744,601 A | 5/1988 | Nakanishi et al. | |
| 4,844,544 A * | 7/1989 | Ochiai | 297/216.12 X |
| 4,991,907 A * | 2/1991 | Tanaka | 297/408 |
| 5,328,244 A * | 7/1994 | Ishihara et al. | 297/391 |
| 5,622,405 A | 4/1997 | Pitencel et al. | |
| 5,769,489 A * | 6/1998 | Dellanno | 297/216.12 X |
| 5,820,211 A | 10/1998 | Heilig et al. | |
| 5,961,182 A * | 10/1999 | Dellanno | 297/216.12 |
| 6,585,318 B1 * | 7/2003 | Tak | 297/216.12 X |
| 6,880,891 B2 * | 4/2005 | Yetukuri et al. | 297/410 |
| 7,066,544 B2 * | 6/2006 | Tseng | 297/216.12 X |
| 7,090,292 B2 * | 8/2006 | Dellanno | 297/216.12 |
| 7,325,877 B2 * | 2/2008 | Brockman et al. | 297/408 |
| 7,410,218 B2 * | 8/2008 | Kotani et al. | 297/408 |
| 7,448,678 B2 * | 11/2008 | Browne et al. | 297/216.12 |
| 7,537,282 B2 * | 5/2009 | Veine et al. | 297/216.12 |
| 7,594,697 B2 * | 9/2009 | Browne et al. | 297/216.12 |
| 7,740,319 B2 * | 6/2010 | Furukawa et al. | 297/408 |
| 2001/0040396 A1 * | 11/2001 | Kreuels et al. | 297/216.12 |
| 2002/0060482 A1 | 5/2002 | Sakahibara | |
| 2005/0001463 A1 | 1/2005 | Yetukuri et al. | |

FOREIGN PATENT DOCUMENTS

| | | |
|---|---|---|
| DE | 198 00 078 A1 | 7/1999 |
| DE | 198 50 758 A1 | 5/2000 |
| DE | 100 45 070 A1 | 3/2002 |
| DE | 102 60 582 B3 | 6/2004 |
| EP | 0 593 854 A1 | 4/1994 |
| EP | 0 825 061 A2 | 2/1998 |
| EP | 1 201 491 A | 5/2002 |
| EP | 1 201 491 A2 | 5/2002 |
| FR | 2 741 574 A | 5/1997 |

* cited by examiner

Force Equilibrium in x $F_x = F_{gx} - F1_{kx}$

Force Equilibrium in z $F_z = F_{gz} + F1_{kz}$

Torque Equilibrium about z established in the HCG $M_y = F1_{kz} \cdot k1_x + F1_{kx} \cdot k1_z$
$+ F_z \cdot C1_x - F_x \cdot C1_z$

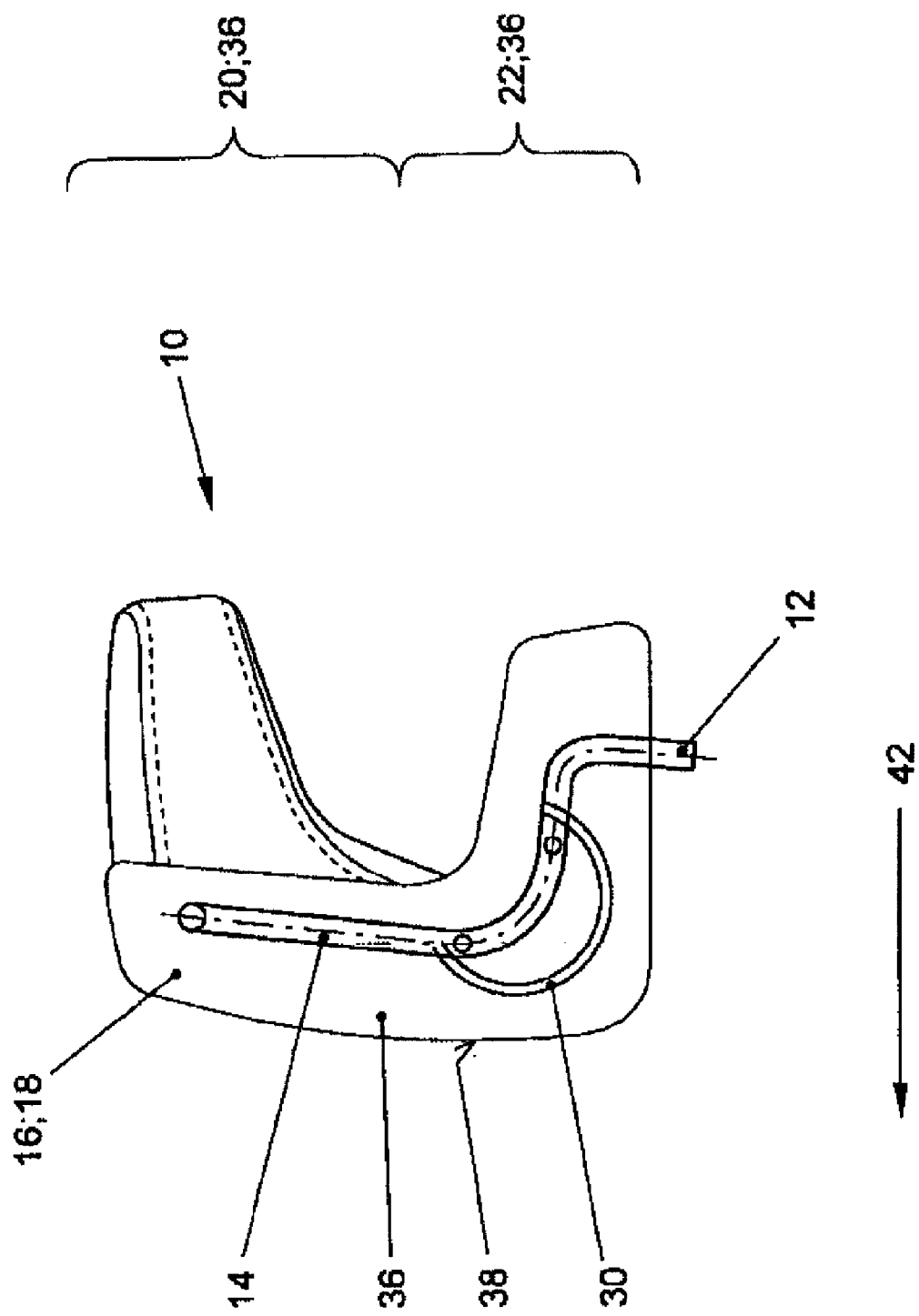

Force Equilibrium in x
$$F_x = F_{gx} - F1_{kx} - F2_{kx}$$

Force Equilibrium in z
$$F_z = F_{gz} + F1_{kz} + F2_{kz}$$

Torque Equilibrium about z established in the HCG $$M_y = F1_{kz} \cdot k1_x + F1_{kx} + k1_z$$
$$+ F2_{kz} \cdot k2_x - F2_{kx} \cdot k2_z$$
$$+ F_z \cdot C1_x - F_x \cdot C1_z$$

HEADREST FOR PROTECTING AGAINST WHIPLASH

The invention is directed to a headrest for a vehicle seat, in particular for an automobile seat, with the features recited in the preamble of claims 1 and 12.

Conventional crash-activated headrests are used to improve the safety of occupants in automobile accidents. While conventional headrests have a higher risk of injury in a rear end crash even at low impact speed, use of crash-activated headrests can drastically reduce the risk of the so-called "whiplash effect", a serious cervical spine injury and, more particularly, the risk of frequent whiplash trauma caused by an overexpansion and overstressing the cervical spine and muscular support system.

The whiplash effect and the associated spinal injuries in the cervical spinal region are referred to as "whiplash."

The crash-activated headrest is configured for a relatively large distance between head and head rest under normal driving conditions compared to conventional headrests. This always provides a maximum of comfort (freedom of head movement) under normal driving conditions. In the event of a rear end crash, however, the distance between head and head rest should be a minimum, because this distance significantly contributes to the risk of injury in the cervical spine area.

Several solutions with active headrests for preventing injuries in the cervical spine area are known.

Several documents, such as DE 198 00 078 and DE 198 50 758, propose a solution for this problem in that the mass of inertia of the vehicle occupants ("triggered by the body") applies a greater load to the upholstered section of the seat rest during a rear collision, which in turn causes additional technical components arranged between the upholstered section of the seat rest and the headrest to move the headrest in the forward (driving) direction. However, these solutions have the disadvantage that the employed safety devices, which depend on the mass of the vehicle occupants, cannot guarantee activation of the headrest regardless of the circumstances. In particular, when the body weight of vehicle occupants is smaller, there is a risk that the safety device will not be fully active or not to the fullest extent in the event of an accident.

In a second group of headrests, the headrest rely on an additional trigger mechanism which does not depend on the inertia of the vehicle occupants ("externally triggered").

For example, EP 0 593 845 discloses incorporation of a gas sack in the headrest, which is controlled in a rear end crash by a rear end sensor, activated by a pyrotechnic gas generator and inflated within a very short time. Because the distance between the head and the headrest can vary significantly, the head would be pushed forward with an undesirable force upon activation of the gas sack, if the distance is very small. Moreover, this arrangement requires a rear end sensor and pyrotechnic means and is therefore quite complex.

EP 0 825 061 A2 also discloses a device for pivoting a headrest in the event of a rear impact. The device includes a tensioned spiral spring integrated in the headrest, which is relaxed in a rear impact, with the released energy pivoting the support element. The pivoting motion of the headrest is initiated by an inertia sensor, which releases the spiral spring at a predetermined acceleration, whereby the inertia sensor itself is pivoted rearward about an axis relative to the vehicle. Disadvantageously, the pivoting motion of the headrest inevitably requires a longer reaction time, due to the arrangement of the components required for activating and pivoting the headrest as well as the inertia of the respective masses. However, the movement must be extremely fast, in particular in those situations where fast reaction is an absolute prerequisite for safe operation. During activation of headrests, even a time span of several milliseconds can be crucial for preventing injuries.

DE 102 60 582 discloses another, rather complex solution of an externally triggered, crash-activated headrest which in the event of a rear end crash releases a magnetic holding plate with a magnet, which receives a magnetic pulse.

In the event of a rear end crash, the distance between the head and the headrest should be kept to a minimum, with a residual distance for providing comfort, so that adverse effects cannot be entirely eliminated.

Based on these considerations, the construction of the headrest itself also plays a significant role for providing the desired protection, in particular for preventing cervical spine injuries and the risk of whiplash trauma, regardless if conventional headrests or active headrest systems are used to solve the problem.

An intelligent design of the headrest itself would already reduce the risk of injury to a certain degree, even when using conventional headrests or headrests with active release systems for vehicle seats. Expensive active headrest systems may be eliminated if the headrest itself already offers adequate protection.

Because so much research was directed to active headrest systems, structural design changes in the headrests themselves have been neglected. The present invention starts from the aforedescribed state-of-the-art, with the goal to improve the construction of the headrest itself.

Is therefore an object of the invention to provide solutions for the construction of headrests, which can lead to a reduction of head and/or HWS injuries and which can be used with both conventional and active headrest systems. The novel headrest to be provided should not only reduce the rebound of the head on the headrest, but should also specifically guide the head in an x-z plane.

According to an aspect of the invention, the head is stabilized and guided and the effect from whiplash is reduced by moving the head of a vehicle occupant into contact with the headrest at least two different heights of the headrest (two-point support) so as to form a head center of gravity (HCG) between these heights of the headrest, thereby reducing or neutralizing a torque (My) about a y-axis (y-y) in the region of the cervical spine and for preventing injuries caused by an accident of a seat occupant, in particular for preventing cervical spine syndrome and/or whiplash at the moment of a frontal and/or rear end impact.

In a first alternative embodiment of the invention, a foam base body of the headrest for guiding the head and for reducing or neutralizing a torque (My) about a y-axis (y-y) in the region of the cervical spine and for preventing injuries caused by an accident of a seat occupant, in particular for preventing cervical spine syndrome and/or whiplash at the moment of a frontal and/or rear end impact, includes at least in a front section of the foam base body and therefore on a contact surface, which stabilizes the head (100, 100') in the event of a crash, a first foam disposed essentially in an upper region of the headrest and a second foam disposed essentially in an lower region of the headrest, wherein the foams have different dynamic characteristics.

In a second alternative embodiment, for guiding the head and for reducing or neutralizing a torque (My) about a y-axis (y-y) in the region of the cervical spine and for preventing injuries caused by an accident of a seat occupant, in particular for preventing cervical spine syndrome and/or whiplash at the moment of a frontal and/or rear end impact, a crash beam is arranged in or on the headrest frame/headrest box of the headrest substantially in a lower region of the headrest in the interior of the foam base body near a contact surface which stabilizes the head in the event of a crash.

According to a third alternative embodiment, the first and second alternative embodiments can be used in combination.

In preferred embodiments of the invention, all the alternative embodiments have in common that in a center section or in a perpendicular center plane, the head can be brought into "two-point contact," meaning that the head contacts the headrest across an area, along a line or at a point.

According to a preferred embodiment of the invention, the foams employed in the first alternative embodiment may include foams of different densities and/or firmness and/or viscosities and therefore different dynamic characteristics. In a preferred embodiment, the first foam has a lower viscosity and a lesser firmness compared to the second foam. The first foam arranged in the upper region is therefore softer under dynamic loading than the second foam in the lower region of the headrest.

Advantageously, the second foam has a velocity-dependent spring characteristic with a constant spring constant. Such foams are viscoelastic are also referred to as "crash-active" foams. In the event of a crash, these viscoelastic foams provide greater damping at a higher impact velocity of the head on the headrest due to a velocity-dependent spring characteristic, thereby providing greater protection for the occupant.

According to a preferred embodiment of the invention, in the second alternative embodiment, a crash beam is arranged in the lower region of the headrest inside the foam body made, for example, from a single foam material, wherein the crash beam is constructed in or on the headrest frame/headrest box of the foam base body so as to change in a possible crash the static or dynamic characteristic in the lower region of the headrest, in particular relative to the remaining upper region.

In a preferred embodiment, the crash beam having static or dynamic characteristics is preferably integrated in the headrest frame/headrest box or is operatively connected therewith, and is implemented as a wire, a wire mesh, a metal plate, a profile, a slotted profile or the like. The crash beam can also be constructed as a solid or hollow body, for example a plastic body or a foam body, which can likewise have static or dynamic characteristics.

A headrest with a first and a second foam in the upper and lower region of the headrest can be provided by combining the first and second alternative embodiments, wherein the foams are arranged at least in the forward section of the upper or lower region.

It is also possible to form the headrest in the upper and lower region entirely of the first or second foam with the corresponding associated dynamic characteristics of the foams.

An additional crash beam with likewise predefined static or dynamic characteristics according to the second alternative embodiment can be arranged in the lower region in combination, regardless if only the forward section of the lower region or the entire lower region is formed from the second foam.

According to a preferred embodiment of the invention, in the afore-described alternative embodiments, a force pair is generated by the inertia forces due to the position of the head center of gravity on the contact surface of the headrest, in particular in the x-z plane in the z-direction, considering the torque $M_y$ about the y-axis in the region of the cervical spine of the head of the vehicle occupant in the region of the cervical spine of the head of the vehicle occupant, wherein the distribution of the force pair creates lever arms on the headrest in the upper and lower region, respectively, relative to the interposed HCG of the head. The force pairs reduce or completely eliminate the torque about the y-axis, thereby stabilizing and guiding the head.

Each of the various alternative embodiments of the invention, separately or in combination, significantly stabilize the head on the contact surface of the head in the event of a crash.

Additional preferred embodiments of the invention are recited as additional features in the remaining dependent claims.

Figure 2:
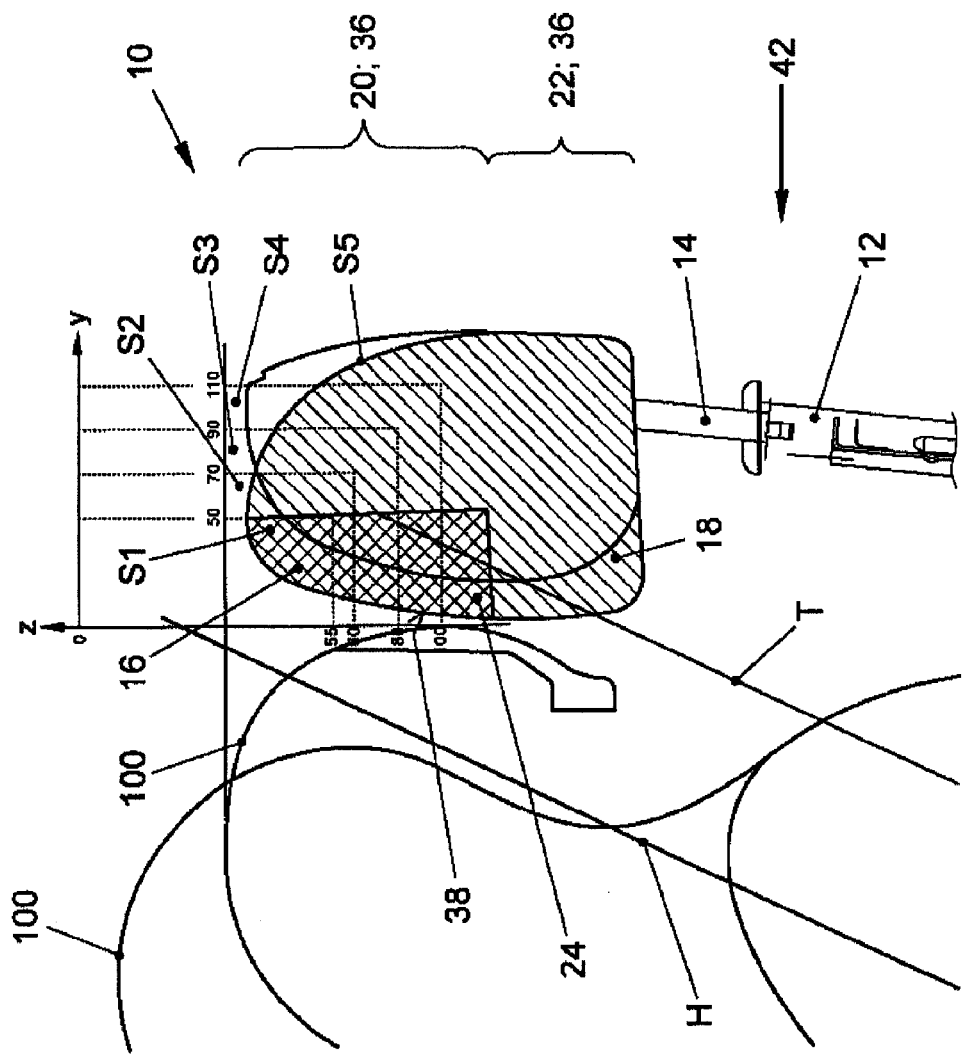
Figure 3A:
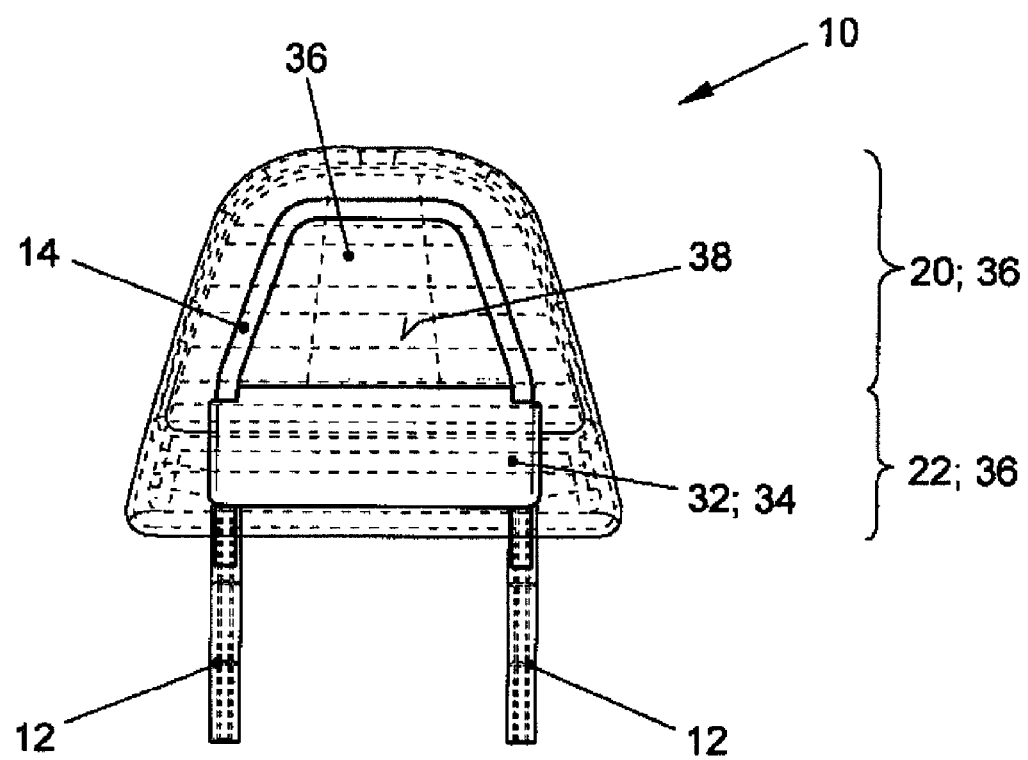
Figure 3B:
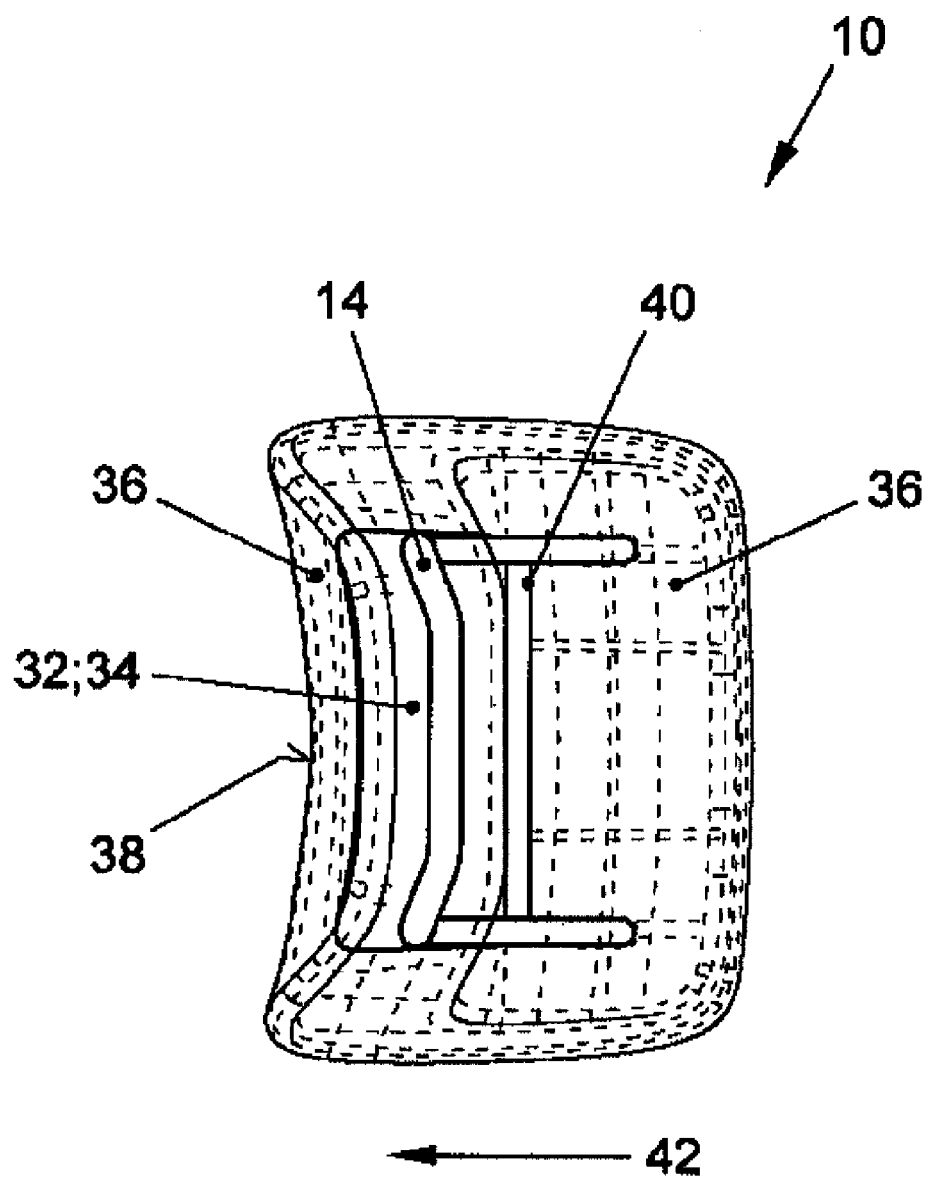
Figure 3C:
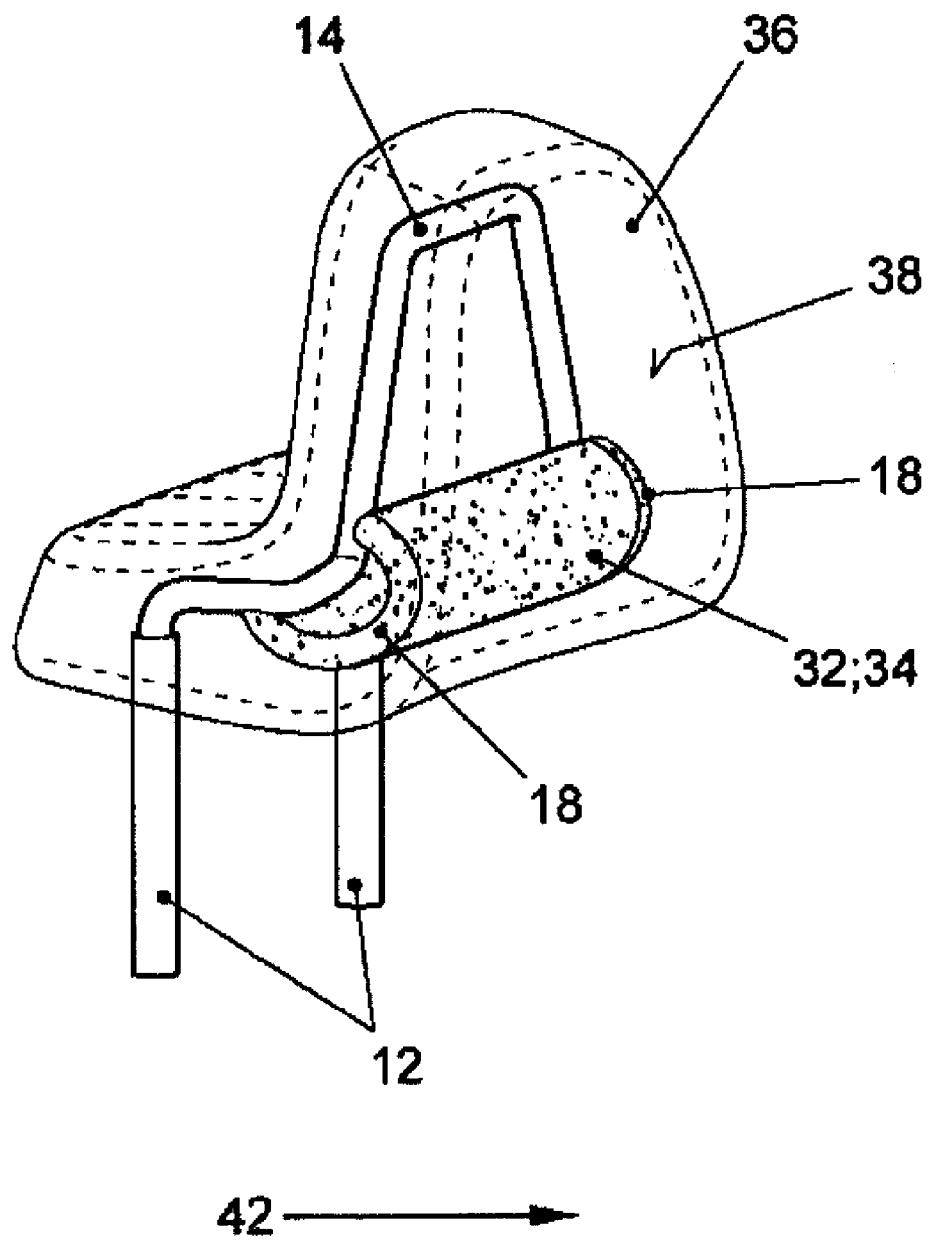
Figure 4B:
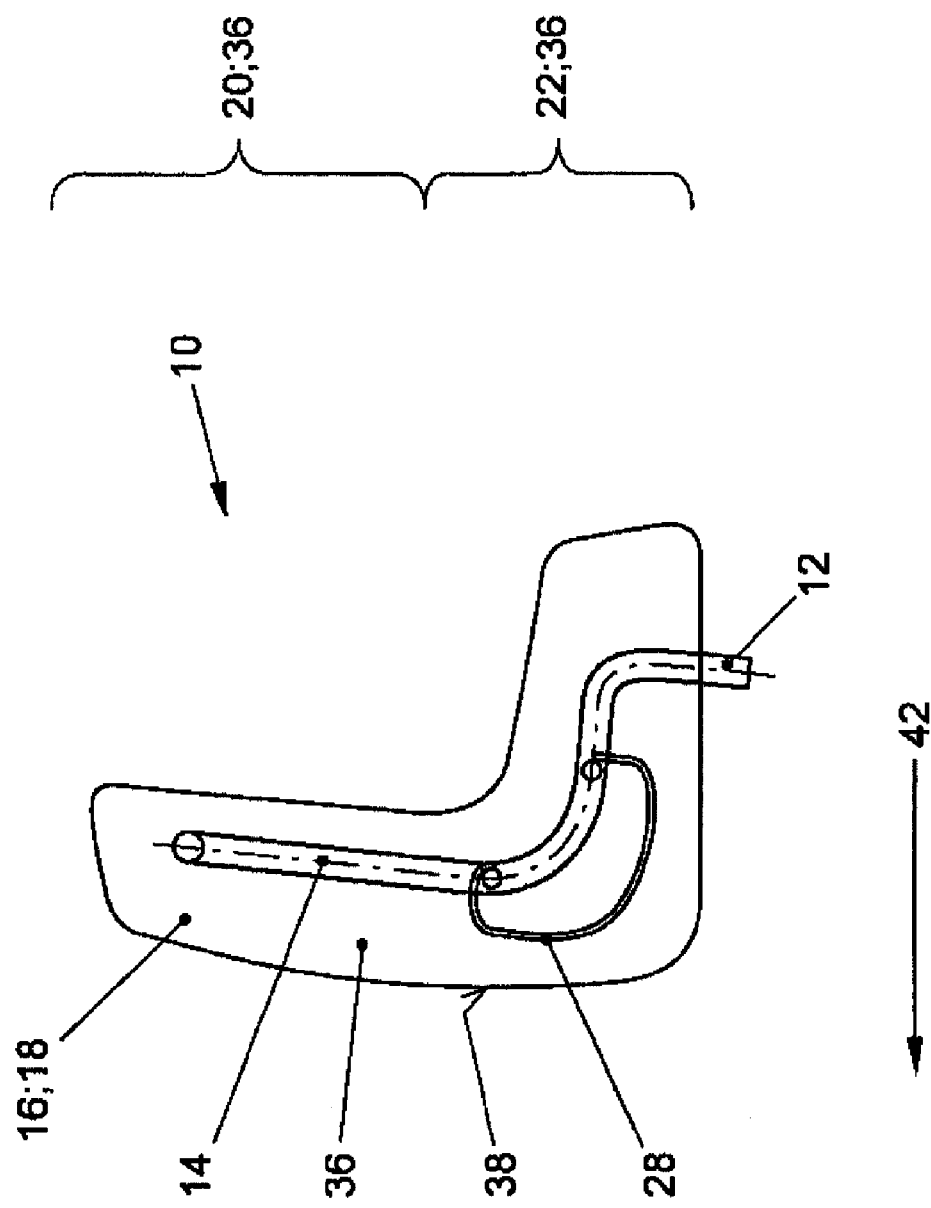
Figure 5:
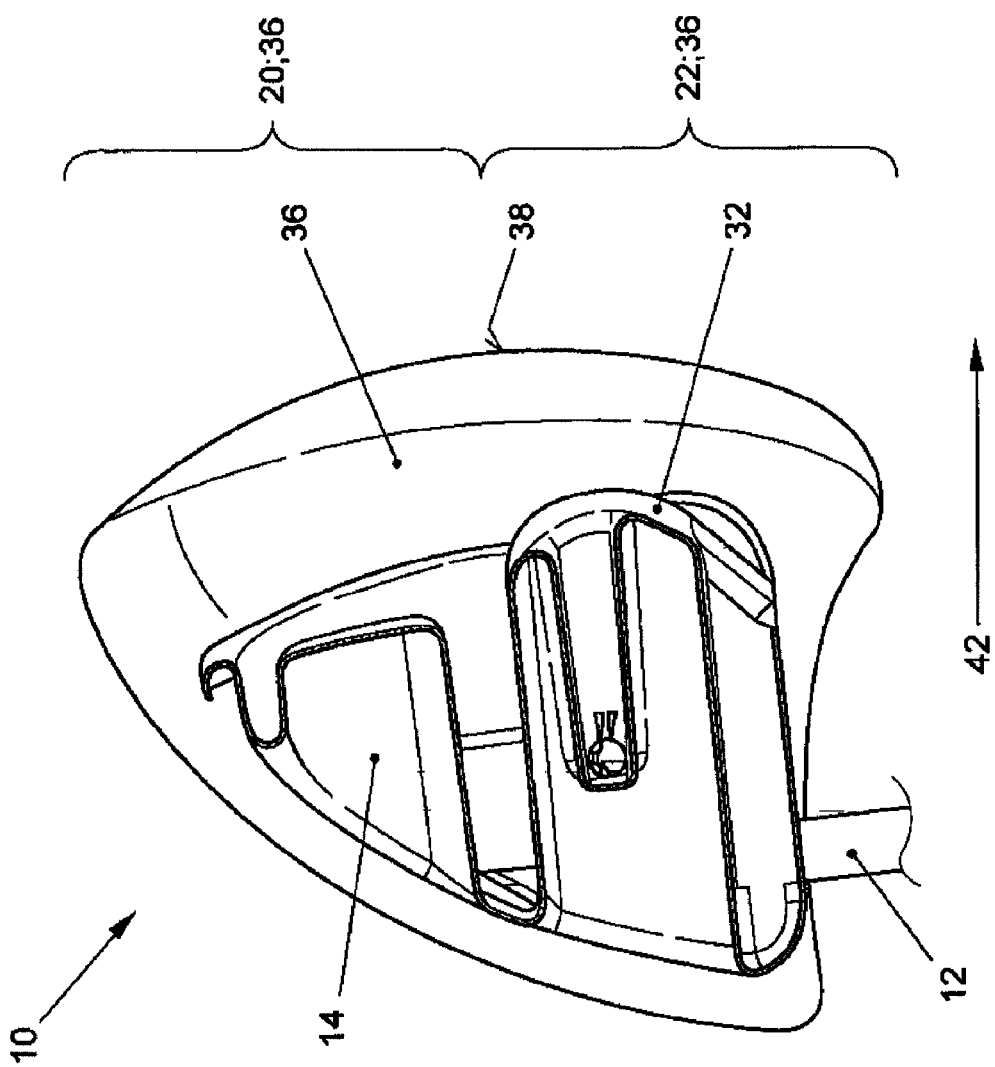
Figure 6:
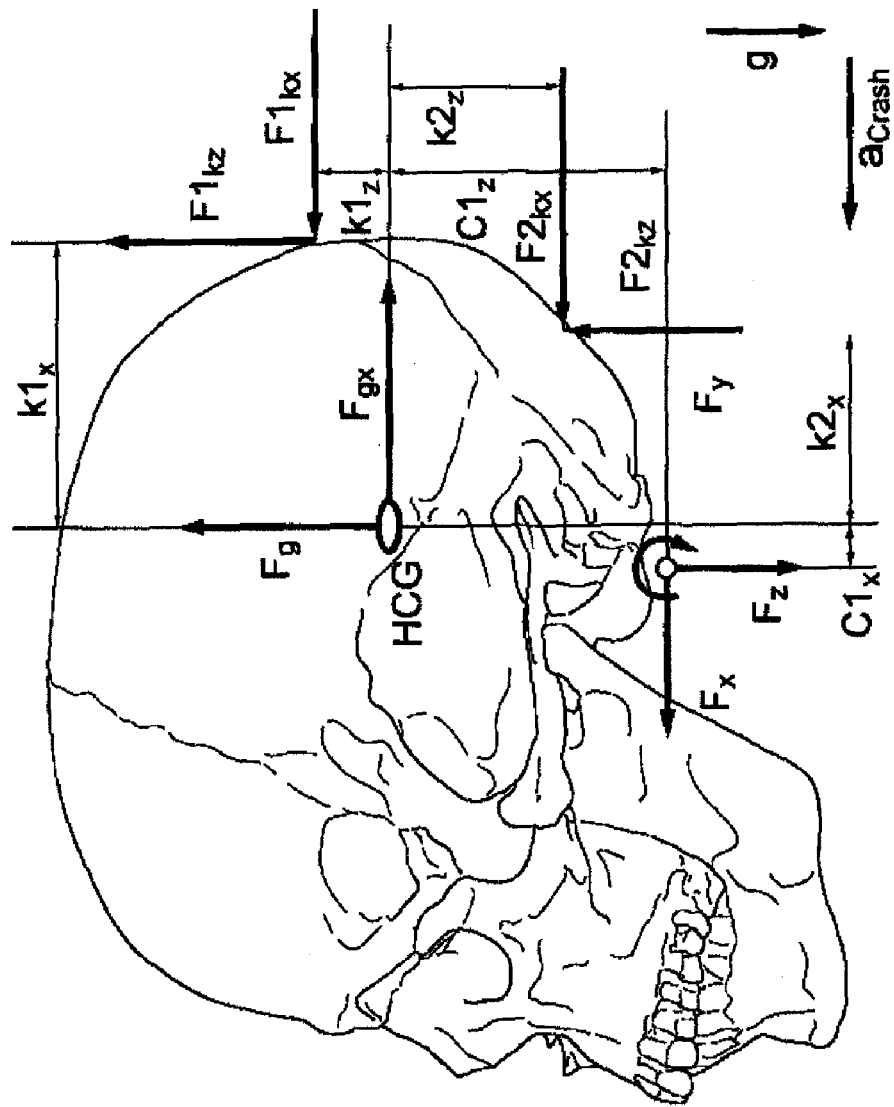

Exemplary embodiments of the invention will be described below with reference to the appended drawings. The drawings show in:

FIG. 1 a diagram of the torque equilibrium about a y-axis produced at the head center of gravity (HCG);

FIG. 2 a diagram of the head rest in a first alternative embodiment, illustrating the definitions of the distances according to the IIHS (Insurance Institute of Highway Safety);

FIG. 3A a front view of the headrest in a first exemplary embodiment of the second alternative embodiment;

FIG. 3B a top view according to FIG. 3A;

FIG. 3C a perspective view of the headrest from the front according to FIGS. 3A and 3B;

FIG. 4A a schematic cross-sectional diagram of the headrest in a second exemplary embodiment of the second alternative embodiment;

FIG. 4B a schematic cross-sectional diagram of the headrest in a third exemplary embodiment of the second alternative embodiment;

FIG. 5 a diagram of a fourth exemplary embodiment of the second alternative embodiment; and FIG. 6 an illustration of the torque equilibrium about a y-axis produced at the head center of gravity (HCG).

FIG. 1 illustrates the physical foundation for the thought process with reference to a diagram of the head (100) of an occupant. General definitions of such theoretical studies include the head center of gravity (HCG), which is the gravity center of the head (100).

According to the established directions, i.e., the travel direction (x) and the vertical direction (z) in the vehicle, mathematical force equilibria can be determined on the HCG in the x-direction and the z-direction during a rear end crash with an acceleration $a_{crash}$.

The force equilibrium $F_x$ in the x-direction is composed of the difference between a force $F_{gx}$ from the inertia of the head (100) and a resulting force $F1_{kx}$ transferred from the headrest (10) to the head (100) of the occupant in the opposite direction.

$$F_x = F_{gx} - F1_{kx} \quad [1]$$

The force equilibrium $F_z$ in the z-direction is composed of the sum of a force $F_{gz}$ of the inertia of the head (100) and a resulting force $F1_{kz}$ transferred from the headrest (10) to the head (100) of the occupant in the z-direction.

$$F_z = F_{gz} - F1_{kz} \quad [1]$$

A torque equilibrium $M_y$ about the y-axis is then produced at the point HCG, enhanced by the lever arms spaced from HCG:

$$M_y = F1_{kz} * k_{1x} + F1_{kx} * k_{1z} + F_z * C1_x - F_x * C1_z \quad [3]$$

The torque equilibrium [3] is the sum of the respective products of the resulting forces $F1_{kz}$ and $F1_{kx}$ and a first distance $k1_x$ between the HCG and the point of application of the force $F1_{kz}$ in the x-direction and a second distance $k1_z$ between the HCG and the point of application of the force $F1_{kx}$ in the z-direction, and the product of the pivot force $F_z$ operating in the z-direction and the vertical distance $C1_x$ between HCG and the atlas point (A-point) minus the product of the pivot force $F_x$ and the vertical distance $C1_z$, again between HCG and the atlas point (A-point).

Starting with the theoretical considerations for the torque equilibrium $M_y$ about the y-axis according to FIG. 1, the torque $M_y$ of the head 100 is reduced by changing the design of the headrest 10, because with the solution of the invention, the force equilibrium is changed in favor of the pivot forces $F_x$ and $F_z$, respectively.

To better explain the invention, FIG. 2 shows a headrest with a headrest frame or headrest box 14 terminating in headrest rods which are arranged or attached in a headrest support 12. The part of the headrest frame/headrest box 14 located in the headrest 10, but obscured from view in FIG. 2, and/or the implemented headrest rods are, as is known from conventional headrests, arranged in the headrests support 12 with an adjustable height.

The headrests 10 includes a foam base body 36 which is attached on the headrest frame/headrest box 14.

The headrest 10 is arranged in a measurement field, the IIHS field. This measurement field is used by the "Insurance Institute of Highway Safety" (IIHS) for investigating the position of headrests 10 and forms a starting point for the invention. The head of an occupant is shown in the driving direction 42 in a first position 100 and in a second position 100'. The first position 100 and the distance to the contact surface 38 of the headrest 10 in this exemplary embodiment represents an inclination of the headrest of 24° and a setting for the headrest 10 in its upper locked position horizontally about 40 mm and vertically about 10 mm, as measured from the back of the head of the occupant. In the second position 100' of the head of the occupant, the occupant's head is depicted for an inclination of the headrest of 25°, whereby the distance between the back of the head of the occupant 100' and the contact surface 38 decreases, so that the horizontal distance in the measurement field is only about 2.90 mm and the vertical distance is about 0.90 mm.

These values are recorded for a value of 832 mm of the top edge of the headrest 10 above the H-point. The torso line T of the occupant is parallel thereto.

Based on this measurement field, the IIHS assigns a value of a good (S2) two a headrest position, if the headrest is located in the measurement field between 60 mm in the z-direction and 70 mm in the y-direction. The position is deemed to have an "acceptable" standard (S3), if the headrest 10 is located in the measurement field in a range of 80 mm in the z-direction and of 90 mm in the x-direction. The standard is deemed to be low (S4) if the headrest is located in the measurement field in a range of 100 mm in the z-direction and of 110 mm in the x-direction. Headrests with values outside these ranges have according to the IIHS an "unacceptable" standard (S5). The headrest 10 depicted in FIG. 2 has a "very good" standard (S1), because the contour of the headrest 10 has a range of <55 mm in the z-direction and of <50 mm in the x-direction, with the headrest forming the foam base body 36.

The entire foam base body 36 of conventional headrests is formed of the same foam material. The solution depicted in FIG. 2 shows that the front section 24 of the headrest 10 is divided into an upper range 20 and a lower range 22.

According to the invention, the upper range 20 has a first foam 16 and the lower range 22 a second foam 18. In the first alternative embodiment of the depicted exemplary embodiment, the first foam 16 is implemented only in the front section 24; however, the entire upper region 20 of the headrest 10 may also be formed of the first foam 16. In addition to the excellent conditions with respect to the distance between the headrest 10 and the head of the occupant according to the IIHS standard, this solution furthermore better stabilizes and guides the head of the occupant in the event of a crash in the first position 100 and the second position 100', respectively. This includes, of course, all intermediate positions of the occupant's head not specifically mentioned, which can be attained by employing different foams.

The first foam 16 has a smaller viscosity than as a second foam 18 and a lesser firmness. The first foam 16 is therefore softer compared to the second foam 18, so that in the event of a crash, when the head presses into the upper softer first foam 16, a lower, harder contact surface 38 is formed in the region of the second foam 18. Accordingly, a new force pair formed from the forces $F1_{kx}$ and $F2_{kx}$, as well as $F2_{kz}$, and $F1_{kz}$, acting on the back of the head of the occupant counters the inertia forces $F_{gx}$ and $F_{gz}$, respectively, which act in opposition to the motion direction. The associated lever arms $k1_z$ and/or $k2_z$, as well as $k1_x$ and/or $k2_x$, change depending on the spatial configuration of the harder, second foam 18 in the lower region. With this approach, the torque $M_y$ acting on the back of the head of the occupant 100, 100' is reduced according to the mathematical diagram in FIG. 5, as will be described in detail below.

This solution can therefore be affected or changed by varying different characteristics of the first foam 16 and/or the second foam 18.

Advantageously, the relative velocity of the head 100, 100' is also smoothly decreased in the first foam 16, thereby stabilizing the head 100, 100' in the second foam 18 and potentially reducing the whiplash effect. With this solution and by decreasing the total distance of the headrest 10, the NIC-Index (NIC=Neck Injury Criterion) is improved in the standard S1 by the arrangement of the headrest and by the design of the headrest 10.

Preferably, a viscoelastic foam with a velocity-dependent spring characteristic with a constant spring constant C is used as the second foam 18. Due to its velocity-dependent spring characteristics, the damping of the second foam 18 increases with the impact velocity of the head 100, 100'.

FIG. 3A shows a front view of the headrest 10 in a first embodiment of a second alternative embodiment, with FIGS. 3B and 3C further illustrating a top view and a perspective view of the headrest 10 from the front. Identical components in FIGS. 3A to 3C have the same reference symbols. The headrest 10 has a headrest frame 14 which transitions into headrest supports 12. In the second alternative embodiment, the headrest 10 is produced, for example, as a foam base body 36 made of a single foam material, but can also be constructed from several foam materials according to the first alternative embodiment. A crash beam is arranged in the lower region 22 of the headrest 10, which in FIGS. 3A to 3C is a plastic body 32 or a foam body 34.

FIG. 3A shows the plastic body 32 and the foam body 34, respectively, as a type of insert which is inserted in the headrest frame 14. Either static or dynamic characteristics can be attained in the lower region 22 of the headrest 10 by selecting as the different materials plastic or foam. The crash beam is here configured as an insert in a two-part construction. A one-part construction which can also be employed is attained by integrating the crash beam in the headrest frame.

FIG. 3B shows a top view of the headrest, illustrating a cross beam 40 arranged inside the headrest frame 14 to improve stability, with the plastic body 32 or the foam body 34 being arranged in front of the headrest frame 14, as viewed in the driving direction 42.

In the event of a crash, the headrest 10 reduces the torque $M_y$ to the back of the head of the occupant 100, 100', as already described with reference to the first alternative embodiment, due to either its static or its dynamic characteristics.

The characteristics of the second foam described with reference to FIG. 2 generally apply also to the characteristics of the foam body 34.

FIG. 3C shows once more—with the same reference symbols—in a perspective view the crash beams 32, 34 which can be attached to, or formed on, or integrated in, the headrest frame 14.

An embodiment with an integrated crash beam in the headrest box 14 is illustrated in FIG. 5.

FIG. 4A shows in a schematic cross-sectional view a second exemplary embodiment of the second alternative embodiment of the headrest 10 a crash beam constructed from a tubular profile 30. The tubular profile is arranged in the lower region 22 of the headrest.

The crash beam 30 formed of a tubular profile and the headrest 10 formed in the upper region 20 lead to a "two-point contact" in the lower region. The headrest 10 is formed herein as second upper contact surface by the first or second foam 16, 18 and the headrest frame 14.

In a third exemplary embodiment, FIG. 4B shows another schematic cross-sectional diagram of the headrest 10 constructed with a crash beam made of a metal plate 28. The metal plate is arranged in the lower region 22 of the headrest. This also results in a "two-point contact" in the lower region formed by the crash beam 34 made of the metal plate and the headrest 10 formed in the upper region 20, which is here also formed as second upper contact surface by the first or second foam 16, 18 and the headrest frame 14.

In this example, the tube 30 or the metal plate 28 are formed on or suitably attached to the headrest frame 14 in the region of the contact surface 38, preferably spaced from the contact surface 38 by up to 16 mm below the contact surface 38, thereby forming the crash beam in the lower region of the headrest 10. The headrest frame 14 may have additional cross beams 40 which can also be used as attachment points for the tubular profile 30 (FIG. 4A) or the metal plate 28 (FIG. 4B).

Not depicted in the FIGURES, although part of the invention, is the combination between the first and second foam 16, 18 in the upper region 20 and/or in the lower region 22, and the crash beams 26, 28, 30, 32, 34.

Returning now to FIG. 2, an additional crash beam 26, 28, 30, 32, 34 may also be arranged proximate to the contact surface 38 of the headrest 10 in the second foam 18 in the lower region 22 in addition to the characteristics of the preferably viscoelastic foam. With this approach, additional beneficial dynamic and static effects may be superimposed on the headrest 10, because the respective additional crash beam 26, 28, 30, 32, 34 can have static properties as well as dynamic properties.

Finally, FIG. 5 shows a first exemplary embodiment of the second alternative embodiment, wherein a crash beam 32 is integrated in the lower region 22 of the headrest box 14. The crash beam 32 may be, for example, a part of the headrest box 14 made of plastic and may have any suitable shape which provide in the foam base body 36 a second support point for the head on the headrest 10 below the height of the center of gravity.

The crash beam 26, 28, 30, 32, 34 can be made as a component of the headrest frame/headrest box 14 of injection-molded plastic, or as a component that can be attached to the headrest frame/headrest box 14.

FIG. 6 illustrates and describes mathematically the effects of the described solutions on the formed contact surface 38 or the formed support point in the lower region 22 of the headrest 10, which in comparison to FIG. 1 includes a force pair which changes the torque $M_y$ about the y-axis (y-y).

According to FIG. 5, the solutions (alternative embodiments) described with reference to FIGS. 2 to 4C reduce the torque in comparison to FIG. 1, because other force vectors are introduced in the equations describing the torque equilibrium.

Based on the formulas for the force equilibria $F_x$ and $F_z$ [4] and [5], the torque equilibrium $M_y$ [6] about the y-axis at the point HCG then becomes:

$$F_x = F_{gx} - F1_{kx} - F2_{kx} \quad [4]$$

$$F_z = F_{gz} + F1_{kz} + F2_{kz} \quad [5]$$

$$M_y = F1_{kz} * k1_x + F1_{kx} * k1_z + F2_{kz} * k2_x - F2_{kx} * k2_z + F_z * C1_x - F_x * C1_z \quad [6]$$

The torque equilibrium is the sum of the respective products of the forces $F1_{kz}$ and $F1_{kx}$ and a first distance $k1_x$ of the HCG from the point of application of the force $F_{kz}$ in the x-direction and a second distance $k1_z$ of the HCG from the point of application of the force $F_{kz}$ in the z-direction, and the product of the inertia force $F_z$ operating in the z-direction and the vertical distance $C1_x$ between the HCG and the atlas point (A-point) minus the product of the inertia force $F_x$ and the vertical distance $C1_z$, also between the HCG and the atlas point (A-point), wherein the products of the values $F2_{kz} * k2_x - F2_{kx} * k2_z$ represent respective force components in the z-direction and x-direction that contribute to the torque.

In the torque equilibrium $M_y$, the aforedescribed solutions provide essentially in the lower region 22 of the headrest 100' the additionally introduced force $F2_{kz}$ in the vertical direction as a product with an associated second distance from the HCG, and the additionally introduced force $F2_{kx}$ in the horizontal direction with an associated second distance from the HCG $k2_z$, which counteract the inertia force $F_{gx}$ and $F_{gz}$, respectively.

If all forces in equation [6] cancel each other, then the torque $M_y$ is completely eliminated, and hence also the whiplash effect. Although such reduction to zero cannot be achieved reproducibly even under identical conditions for all possible crashes and occupants due to the different size of the occupants and the unknown external forces in the event of a crash, and further due to the distance between the contact surface 38 of the headrest 10 and the head 100, 100' of the occupant (see measurement field, FIG. 2), the residual torque $M_y$ on the y-y axis can advantageously at least be reduced with the invention.

LIST OF REFERENCE SYMBOLS 10 headrest
12 headrest support
14 headrest frame/headrest box
16 first foam
18 second foam
20 upper region
22 lower region
24 front section
26 crash beam—wire/wire mesh
28 crash beam—metal plate
30 crash beam—profile
32 crash beam—plastic body
34 crash beam—foam body
36 foam base body (padding)
38 contact surface 40 crossbeam
42 driving direction
100 head of the occupant (inclination of the rest 24°)
100' head of the occupant (inclination of the rest 25°)
H H-point line
T torso line
S1 very good standard
S2 good standard
S3 acceptable standard
S4 poor standard
S5 unacceptable standard
$a_{crash}$ acceleration rear end crash
g acceleration due to gravity
c spring characteristic
HWS cervical spine
HCG head center of gravity
A-point atlas point
Index x x-direction
Index y y-direction
Index z z-direction
x x-direction
y y-direction
z z-direction
Forces
$F_x$ force components in x-direction
$F1_{kx}$ first force (x-direction)
$F2_{kx}$ second force (x-direction)
$F_z$ force components in z-direction
$F1_{kz}$ first force (z-direction)
$F2_{kz}$ second force (z-direction)
$F_{gz}$ inertia of the head 100 in z-direction
$F_{gx}$ inertia of the head 100 in x-direction
Torque
$M_y$ torque about y-axis
Distances
$k1_x$ first distance in (x-direction) between HCG and the force $F1_{kz}$
$k1_z$ first distance (z-direction) between HCG and the force $F1_{kx}$
$c1_x$ first distance (x-direction) between HCG and the atlas point
$c1_z$ first distance (y-direction) between HCG and the atlas point
$k2_x$ second distance (x-direction) HCG—force $F2_{kz}$
$k2_z$ second distance (z-direction) HCG—force $F2_{kx}$

The invention claimed is:

1. Headrest for a backrest of an automobile seat, the headrest comprising a headrest box and a foam base body surrounding the headrest box, wherein in an event of a rear impact on the automobile, a head of the seat occupant is movable into contact with the headrest at least two different heights of the headrest so as to form a two-point support and a head center of gravity between these heights of the headrest, wherein the two-point support is formed
   (i) in an upper region of the headrest in a first height of the headrest box, substantially through the foam base body with a dynamic characteristic of a foam and
   (ii) in a lower region of the headrest in a second height of the headrest box, substantially through a crash beam as a solid or hollow body integrated in the headrest box as one piece, inside of the foam base body near a contact surface at the headrest with a dynamic characteristic of the crash beam and the foam,
wherein the crash beam is adapted to stabilize the head of the seat occupant, in an event of an accident, by changing the dynamic characteristic in the lower region of the headrest, relative to the remaining upper region of the headrest.

2. The headrest according to claim 1, wherein contact with the headrest in the at least two different heights occurs at a two-point contact that is selected from a group consisting of across an area, along a line and at a point.

3. The headrest according to claim 1, wherein, for guiding the head and for reducing or neutralizing a torque about a y-axis in a region of the cervical spine of the seat occupant and for preventing injuries caused by an accident the foam base body of the headrest is made, at least in a front section of the foam base body and therefore on a contact surface, of a first foam disposed essentially in the upper region of the headrest and a second foam disposed essentially in the lower region of the headrest, wherein the first and second foams have different dynamic characteristics.

4. The headrest according to claim 3, wherein the first and second foams have different densities.

5. The headrest according to claim 4, wherein the first foam has a lower viscosity and lesser firmness than the second foam.

6. The headrest according to claim 5, wherein the second foam is a viscoelastic foam with a velocity-dependent spring characteristic and a constant spring constant.

7. The headrest according to claim 6, wherein the crash beam is configured as a foam body inside the headrest box, wherein the crash beam and the foam base body have different densities.

8. The headrest according to claim 6, wherein the second foam provides greater damping of the head on the headrest at higher velocity due to the velocity-dependent spring characteristic.

9. The headrest according to claim 1, wherein the crash beam is made from a material selected from the group consisting of a wire, a wire mesh, a metal plate, a profile, a plastic body and a foam body.

10. The headrest according to claim 1, wherein the headrest is stationary relative to the backrest in an event of an accident.

11. The headrest according to claim 1 wherein at least a portion of the headrest is movable immediately towards the head of the seat occupant in an event of an accident.

12. A headrest for a backrest of an automobile seat, the headrest comprising a headrest box and a foam base body surrounding the headrest box, wherein a center of gravity of a head of a seat occupant is contactable at two or more different heights of the headrest, wherein a contact surface for the head of the seat occupant is formed
   (i) in a foam arranged in an upper region of the headrest of the foam base body at a first height defined as a first vertical distance between the center of gravity of the head of the seat occupant and a first force introduced into the head of the seat occupant, wherein the upper region has a dynamic characteristic of the foam, and
   (ii) at a second height in a lower region of the headrest by a crash beam arranged inside the foam base body of the headrest and integrated as a single piece in the headrest box of the headrest, the second height being defined as a second vertical distance between the center of gravity of the head of the seat occupant and a second force introduced into the head of the seat occupant, wherein the lower region has a dynamic characteristic of the crash beam and the foam, wherein, in an event of a crash, a stabilizing contact surface is formed on the headrest in the upper region of the headrest and a stabilizing, line-shaped contact is formed in the lower region of the headrest, wherein the crash beam is adapted to stabilize the head of the seat occupant, in an event of an accident, by changing the dynamic characteristic in the lower region of the headrest, relative to the remaining upper region of the headrest.

13. The headrest according to claim 1, wherein at least one of the headrest box and the crash beam are made of at least one plastic material.

14. The headrest according to claim 13, wherein the at least one plastic material is an injection-molded plastic.

* * * * *